United States Patent Office 3,796,620
Patented Mar. 12, 1974

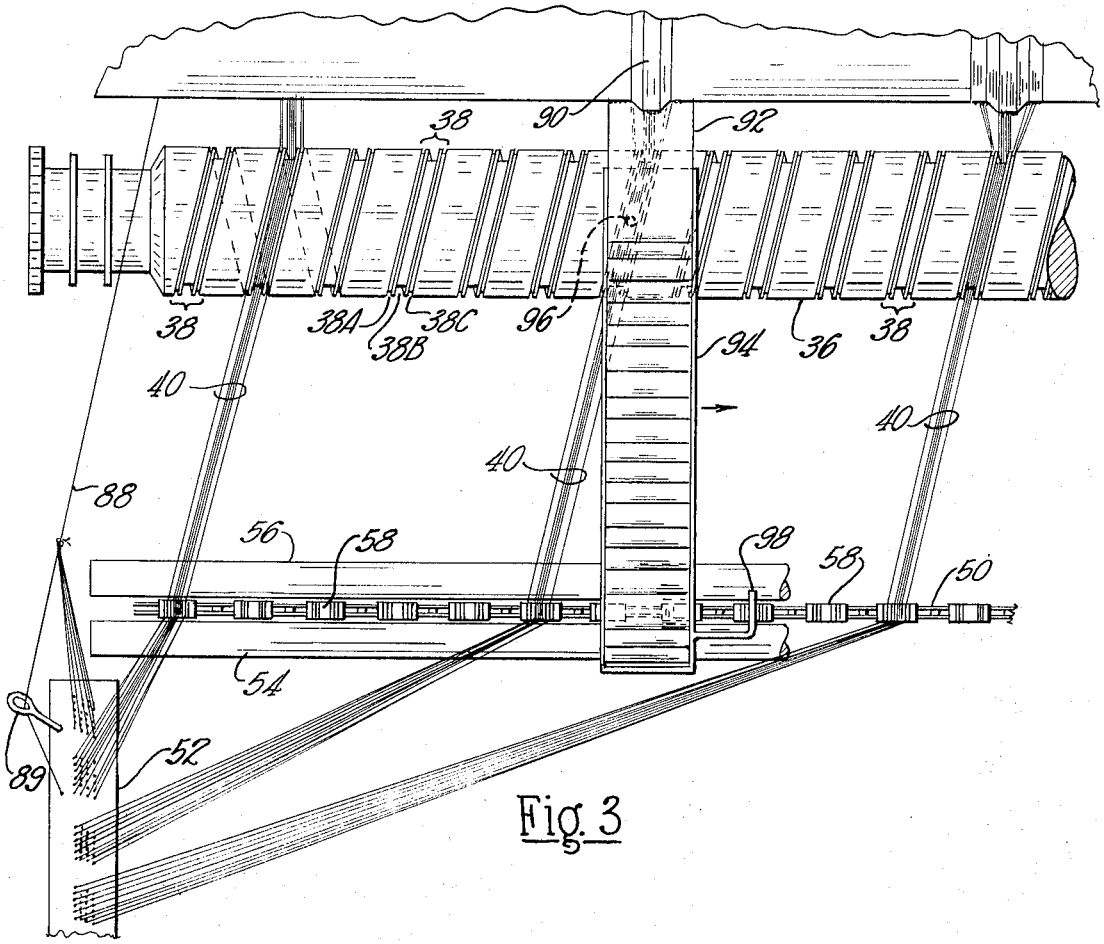
Fig. 3
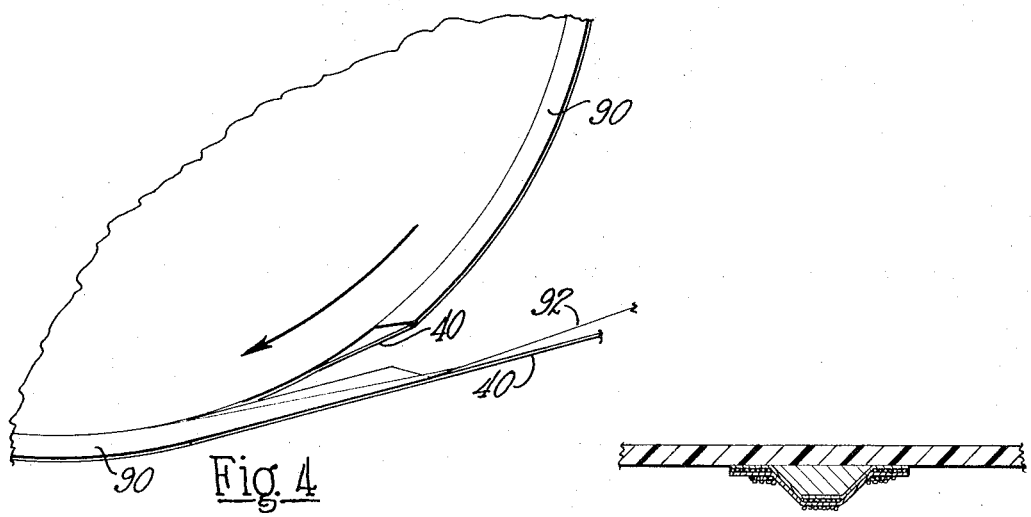
Fig. 4
Fig. 5

3,796,620
METHOD AND APPARATUS FOR GUIDING FEED STOCK TO A LONGITUDINALLY MOVING COLLECTION SURFACE
John William Dunn, Sylvania, Ohio, assignor to Owens-Corning Fiberglas Corporation
Filed Feb. 3, 1972, Ser. No. 223,164
Int. Cl. B65h 81/08
U.S. Cl. 156—171                    13 Claims

ABSTRACT OF THE DISCLOSURE

Method and apparatus for guiding strands coated with resin and other materials onto a revolving mandrel to form locally built-up areas or ribs on the mandrel.

BACKGROUND OF THE INVENTION

The present invention relates to a method and apparatus for depositing feed stock in locally built-up areas on a longitudinally moving collection surface; and more particularly to a method and apparatus for depositing resin coated strands and other materials in locally built-up areas on a rotating mandrel to produce glass fiber reinforced shells having spaced apart stiffening ribs thereon.

Glass fiber reinforced polyester tanks for underground gasoline and chemical storage have been produced heretofore in sections on rotating mandrels. Spaced apart rib forms have been applied over the top of the shell forming materials. Thereafter strands of glass fiber have been wound back and forth over the top of the rib forms by a carriage which traverses the full length of the shell section produced. One such process is disclosed in the Bastone et al. U.S. Pat. 3,412,891.

More recently, a development has taken place wherein a mandrel surface is formed by abutting coils of a continuous band and this surface is continuously slid axially as the continuous band is coiled into its first convolution. Resin and fibers are applied thereto, and after being cured, the ribbon is peeled away from the inside of the shell and fed back to the beginning end of the machine where it is again coiled into position. This produces a continuously advancing mandrel surface on which shells can be produced continuously. One such apparatus is shown and described in U.S. Poulsen Pat. 3,464,879. In the commercial process using this kind of apparatus, the shell sections produced are removed from the mandrel and moved to another area where the shell sections are rotated and the ribs formed on an individual basis.

It has been suggested that ribs can be applied to the shell forming materials applied directly to the longitudinally moving mandrel surface on an individual basis by a carriage which first completes one rib before forming another rib. This requires that the rib forming materials be applied during the limited number of mandrel revolutions which occurs between the spacing of the ribs. In most instances, the ribs must be so closely spaced that such a procedure does not permit ribs to be filament wound to any appreciable extent. Inasmuch as filament winding pretensions the strands, filament winding makes the best use of the strength of the glass fiber strands. When the ribs are formed sequentially as the mandrel moves longitudinally past a rib forming station, the ribs cannot be filament wound to any appreciable extent.

An object of the present invention is the provision of a new and improved method and apparatus for depositing materials from a number of stations onto a surface which moves past the stations in such manner that the materials are deposited over the top of each other in locally built-up areas.

Another object of the invention is the provision of a new and improved guide apparatus for simultaneously guiding materials from a plurality of spaced stations to produce locally built-up areas on a collection surface that is moved therepast.

Another object of the present invention is the provision of method and apparatus for continuously producing large percentage of filament windings.

An object of the present invention is the provision of new and improved guide apparatus for advancing a plurality of spaced apart liquid resin coated materials longitudinally in synchronism with a collection surface, and which apparatus can be easily cleaned.

Further objects and advantages of the invention will become apparent to those skilled in the art to which the invention relates from the following description of the preferred embodiments described with reference to the accompanying drawings forming a part of this specification.

BRIEF DESCRIPTION OF THE DRAWINGS

FIG. 3 is an enlarged fragmentary sectional view taken approximately on the line 3—3 of FIG. 2;

FIG. 4 is a fragmentary sectional view of a rib form being wrapped upon a shell; and FIG. 5 is a fragmentary sectional view through a stiffening rib produced by the apparatus shown in the drawings.

DESCRIPTION OF THE PREFERRED EMBODIMENTS

The method and apparatus of the present invention can be utilized to feed a number of spaced apart elongated stock materials to a collection surface which moves therepast in such manner that the stock materials are sequentially added to each other to effect a desired build up on the collection surface. While the method and apparatus will have utility in the building up of many types of materials on collection surfaces that move therepast, it is herein shown and described as having particular utility in the building up of glass fiber reinforced plastic ribs in a continuous process for producing glass fiber reinforced shells having spaced apart stiffening ribs thereon.

Figure 1:
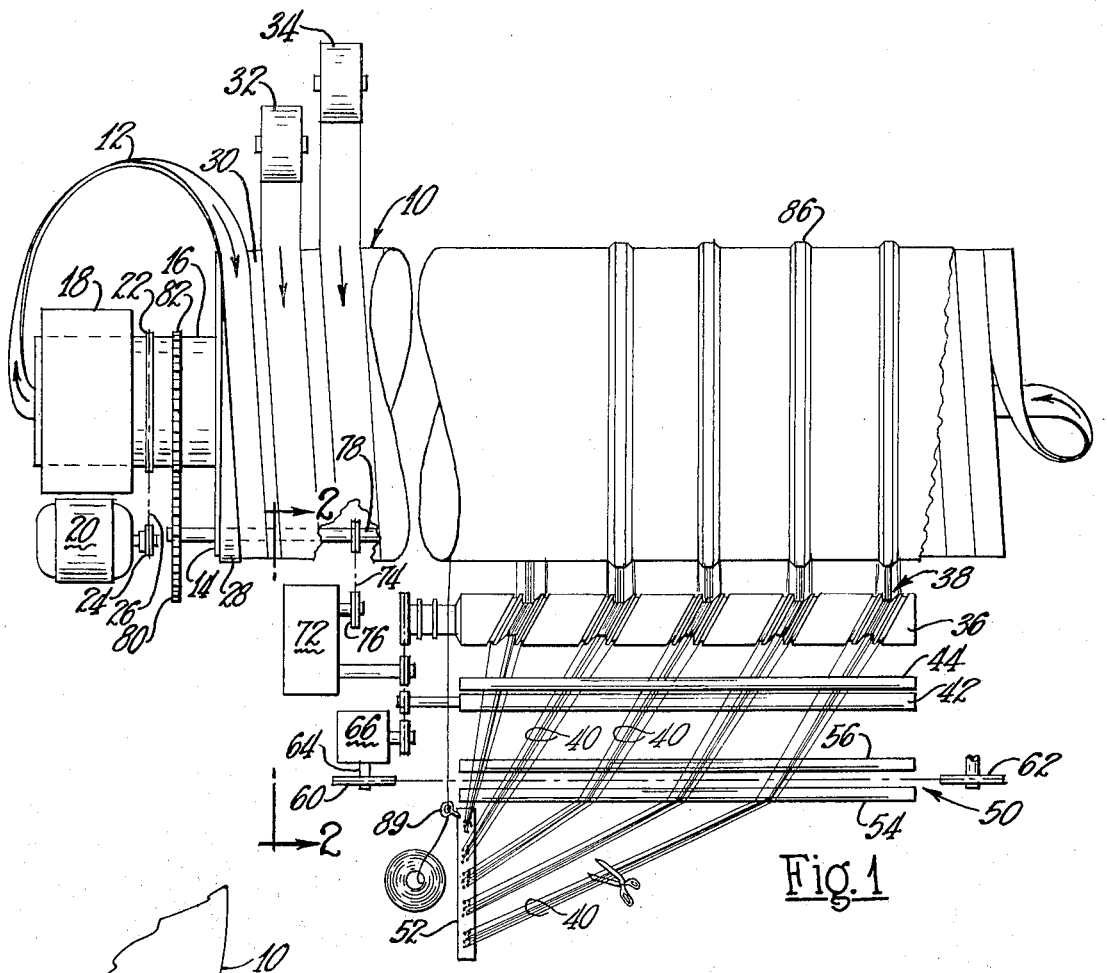
FIG. 1 is a fragmentary plan view of one embodiment of apparatus for performing the method of the present invention.

The apparatus shown in FIG. 1 generally comprises a cylindrical form or collection surface 10 that is formed by an endless band 12 that is coiled around a squirrel cage support 14 therefor. The squirrel cage support is in turn cantilevered by a large rotatable shaft 16 that is in turn cantilevered from a large pedestal support 18. The shaft 16 is rotated by means of the motor 20 through sprockets 22 and 24 and drive chain 26. The endless band 12 is fed onto the squirrel cage 14 between a pie shape cam 28 and its previous coil 30 on the squirrel cage 14, such that the cam 28 slides the coils endwise over the squirrel cage 14 to provide the cylindrical form 10. When the coils 30 reach the other end of the squirrel cage 14, they are uncoiled over suitable rollers not shown, and fed back through the tubular shaft 16 to the feed end of the machine where it is again fed back onto the squirrel cage 14.

In the present instance the form 10 is cylindrical. Cylindrical shells of predetermined wall thickness are formed by wrapping a separation sheet 32, as for example cellophane, over the top of the coils 30 of the endless band 12. Thereafter a plurality of layers of liquid resin impregnated glass fiber mat 34 are wrapped over the separation sheet. In some instances a band of continuous glass fiber strands are wrapped over the coils of mat 34 to hold the same in place and provide additional reinforcing.

For many applications, as for example where the shells are to be buried, it is necessary that stiffening ribs be provided on the shell. In the present instance these ribs are formed prior to the cure of the resin by sequentially winding rib forming materials over the top of each other at spaced apart intervals as the shell is advanced along the longitudinal axis of the machine.

According to the method of the present invention, guiding means are provided for a plurality of elongated spaced apart feed materials which will simultaneously move the spaced apart materials longitudinally in synchronism with the collection surface so that the materials are superimposed on the collection surface. This can be accomplished in some instances with an endless conveyer or belt, but in the present instance where the elongated feed materials are strands that are coated with a sticky liquid resin, an endless belt is not practical. According to the invention the guiding and cleaning problems are solved by a new type of guide surface formed by a feed stock support 36 having helical abutment surfaces thereon which abutment surfaces are adapted to receive transversely positioned elongated feed materials and move them longitudinally thereof. In the preferred form, the abutment surfaces are formed by helical grooves 38 which in this instance comprise a group of three grooves 38A, 38B, and 38C with the center groove 38B being deeper than the grooves 38A and 38C. The construction is such that the feed stock support 36 can be extended to guide materials from any number of feed stations required to achieve the desired build up of materials on the collection surface. As shown in FIG. 1 the support 36 is a cylinder of sufficient length to feed five sets of continuous glass fiber strands to the collection surface. These strands are coated with resin prior to reaching the cylinder 36.

Figure 2:
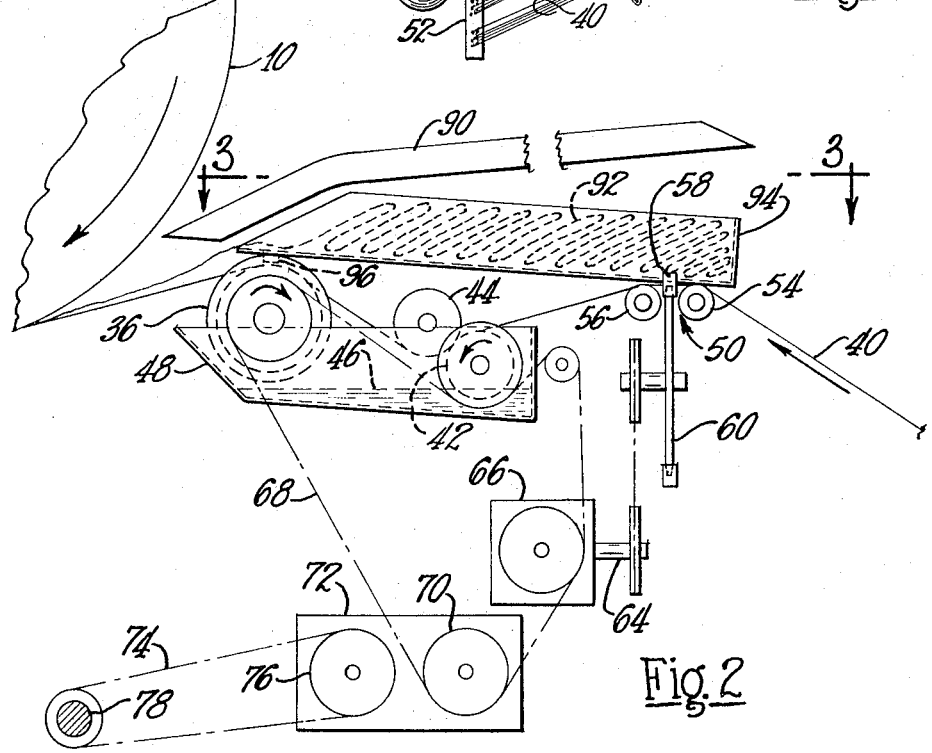
FIG. 2 is a sectional view taken approximately on the line 2—2 of FIG. 1.

The coating operation is accomplished by pulling the strands over a longitudinal dip roll 42 and underneath a companion roll 44 and through the nip provided by the two rolls 42 and 44. As best seen in FIG. 2, the dip roll 42 extends below the liquid level 46 in a pan 48 to pick up resin and carry it into the nip of the rolls. Prior to being fed to the rolls 42 and 44, the strands 40 pass through an auxiliary guide means 50 which is an endless chain conveyer, and which receives the strands 40 from guides 52 that are arranged at right angles to the auxiliary guide 50. The guides 52 are located at floor level beneath the auxiliary guide means 50, and the strands break over stationary guide bars 54 and 56 on opposite sides of the endless chain of the auxiliary guide means 50. The auxiliary guide means 50 includes spaced apart guide eyes 58 fixed to the chain, and the chain passes over head and tails sprockets 60 and 62. The head sprocket 60 is driven in synchronism with the roll 36 by a side outlet shaft 64 of the common gear box 66. The rolls 36 and 42 are driven in synchronism with the auxiliary guide means 50 by a drive chain 68 which passes over a sprocket 70 of a gear reduction unit 72, that is in turn driven by a drive chain 74. The drive chain 74 couples the sprocket 76 of the gear reduction unit 72 with a longitudinal auxiliary drive shaft 78 of the basic machine structure that includes the squirrel cage 14. The shaft 78 is shown as driven by the main shaft 16 of the machine through gears 80 and 82.

The section modulus of the ribs formed by the apparatus shown in the drawings is increased by a strip of rib form material 90 which is fed to the collection surface 10 at one of the intermediate feed stations provided by the guide cylinder 36.

It will be understood that the longitudinal movement of the collection surface 10 per revolution of the squirrel cage 14 will correspond with the width of the endless band 12, which in the present instance will be assumed to be three and one half inches. It will further be understood that the reinforcing ribs 86 can be made at any desired interval, and in the present instance it will be assumed that the ribs are made every 5 revolutions of the collection surface 10, which therefore corresponds to a spacing of 17½". It will be further be understood that the helical grooves 38 can have any desired pitch that is required to deposit the guided materials in desired locations on the collection surface 10. When the materials are to be superimposed, as in the present instance, the pitch of the groove 38 and its rate of rotation relative to the collection surface 10 is such as to correspond or advance with the pitch of the collection surface 10 per revolution.

In the embodiments shown in the drawings, the grooves 38 have a pitch of 3½", and the cylinder 36 is driven at 3 r.p.m. The strands 40, therefore, which produce the ribs 86 will be positioned in segments of the groove 38 that are exactly 5 revolutions apart. For simplicity the roll 36 in FIG. 1 is shown schematically to have a pitch corresponding to the spacing of the ribs 86, whereas in actuality the grooves 38 have a pitch that is ⅕ thereof, as shown in FIG. 3.

According to the method of the present invention, the strands 40 are anchored to the rotating collection surface 10 by means of a continuous anchor strand 88 that is fed to the collection surface through a fixed guide eye 89. The anchor strand 88 therefore is coiled onto the shell forming material at a pitch of 3½". Just after the time that 2 revolutions of the cylinder 36 have occurred following the start of the proceeding rib, one group of the strands 40 are tied onto the anchor strand 88 and are allowed to start to wind in a helix. At the exact time that 5 revolutions of the cylinder 36 have occurred from the time that the preceding strands 40 were placed in the grooves 38, the following strands 40 are placed into the groove, so that they are exactly 5 pitches from the preceding group of strands 40. This arrangement sets the spacing between ribs at exactly 5 revolutions of the collection surface 10 or 17½". After the strands have been wrapped onto the collection surface for approximately 1 revolution, a rib form 90 is fed onto the strand 40 and caused to be sandwiched between the strands and the materials on the surface 10 which form the shell. The leading edge of the rib form 90 is tapered rearwardly at approximately a 30-degree angle to its base, and the trailing edge is beveled at approximately 30 degrees to the crown, so that the ends of the rib form will abut each other after one revolution.

As best seen in FIG. 4, the strands 40 ride up the leading edge of the rib form in a manner generally tangent thereto and then proceed around the top or crown of the rib form. The trailing edge of the rib form is pulled down tangent to the strands 40 to be sandwiched between the leading and trailing edge of the rib form, following which the strands are allowed to make two revolutions around the hoop formed by the rib form 90. The rib form has a cross section that is an isoceles trapezoid with the long parallel side of the trapezoid positioned against the shell forming materials. After two revolutions of the strands 40 have been wrapped over the top of the rib form following the time that the ends are pulled into engagement, a resin coated strip of glass fiber mat is fed to the strands 40. The resin coated mat is pulled down over the top of the rib form 90 by the strands 40. The mat 92 can have any desired length, and as shown in the drawings has a length equivalent to two revolutions of the collection surface 10. Thereafter the strands are allowed to filament wind over the top of the mat for a desired number of revolutions to build up a desired thickness of filament winding. After the desired number of revolutions have taken place, the strands 40 are severed and the severed ends are wrapped onto the rib form. The ends of the strands coming from the supply are brought back to the starting position for tieing onto the anchor strand 88 at the appropriate time to start the process of forming another rib.

The mat 92 may be fed to the strands 40 in any suitable manner and as shown in the drawing is fed from an open top rectangular shaped pan 94 in which the resin coated mat 92 is festooned. One end of the box 94 rests on the cylindrical surface of the cylinder 36 while the other end of the pan is supported from, and slides along, the stationary guide bars 54 and 56. The bottom of the pan 94 is provided with a guide pin 96 which extends down into the helical groove 38 of the cylinder 36 while the back end of the pan contains a lug 98 that is received in an appropriate one of the guide eyes 58 affixed to the auxiliary guide means 50. After the two layers of mat are wrapped onto the rib form and the desired number of wrapped strands 40 are coiled over the top thereof, a structure corresponding to that shown schematically in FIG. 5 is produced.

It will now be apparent that various modifications to the method and apparatus above described can be made. In one such modification the rib forms 90 can be caused to be supported by the strands 40 at one end and be carried by an appropriate part of the auxiliary guide means 50 at a spaced apart location, rather than be fed by hand. In addition, the auxiliary guide 50 can be caused to include a magazine support for the remaining portion of the rib form, which magazine can be caused to be fed automatically with additional replacement rib forms. It will further be seen that although the embodiment is peculiarly adaptable for feeding resin coated strands to a revolving mandrel, the helical abutment surface and the auxiliary guide means 50 can be used to feed other types of elongated strip material to still other types of movable collection surfaces to accomplish other desired types of accumulation of the strip material on the collection surface.

While the abutment surfaces 38 of the feed stock support 36 for moving the feed stock longitudinally of the form 10 have been shown as grooves in a cylindrical roll, it will be understood, that the invention is not so limited, and that any means for forming a helical abutment may be utilized. As for example, a bar can be coiled into a helix and the bar fastened to the external surface of a roll. The helical abutment can also be provided by coiling a suitable channel shaped member into a helical support that is then rotated about its longitudinal axis. In the latter embodiment, the strands would be supported on the web of the channel and the flange portions would act as the stock advancing abutment surface.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. The method of producing a plurality of spaced apart ribs on shells comprising: revolving a shell about a longitudinally extending axis while simultaneously advancing the shell longitudinally of said axis, guiding rib forming material onto the revolving shell for wrapping thereon, moving the guided rib forming material longitudinally of the shell substantially in synchronism with the longitudinal movement of the shell, winding the rib forming material onto the advancing shell, causing the rib forming material to include a hardenable resin before, during or after wrapping onto the shell, and hardening the resin in situ to bond to and stiffen the shell.

2. The method of claim 1 wherein said guiding and moving steps are accomplished by automatic apparatus having a guide track extending over a distance corresponding to the spacing of a plurality of ribs and which continuously recycles to receive materials at the beginning end of said guide track and advance them along said guide track.

3. The method of claim 1 wherein said guiding and moving steps are accomplished by a cylinder having abutment surfaces arranged in a helix which extends longitudinally thereof and which cylinder is rotated about its longitudinally axis, said abutment surfaces abutting and camming the rib forming material longitudinally of said cylinder.

4. The method of claim 3 wherein said abutment surfaces are formed by at least one helical groove in the outer surface of said cylinder.

5. The method of claim 1 wherein said guiding and moving steps are accomplished by an endless conveyor one run of which extends longitudinally of the shell and on which conveyor a plurality of said spaced apart guide means are provided.

6. The method of claim 1 including the sequential steps of: feeding a continuous strand to the shell from a generally fixed station to produce a helically wound anchor strand on the shell, tieing rib forming strands to said anchor strand, feeding said rib forming strands to said guide means at a first station, feeding a rib form to said guide means at a second station, feeding a fiber mat to said guide means at a third station, and cutting off said rib forming strands at a fourth station.

7. A method of producing spaced apart parallel ribs on a shell which is simultaneously rotated about its longitudinal axis and is advanced longitudinally of said axis, comprising: feeding a continuous strand to said shell from a generally fixed station to produce a continuous spirally wound anchor, tieing first rib winding strands to said continuous strand at a generally fixed station and causing said first rib winding strands to be wound onto the shell, guiding said first rib winding strands for longitudinal movement of the shell in general synchronism with the longitudinal advance of the shell to produce a rib wrap of the rib winding strands, and tieing second rib winding strands to the continuous strand at said generally fixed station to start the winding of another rib.

8. The method of claim 7 including: feeding a rib form strip having a crown spaced from a shell engaging surface and the leading end of which is tapered from said shell engaging surface backwardly to said crown onto said rib winding strands and causing said rib winding strands to ride up said leading edge and over said crown, causing the opposite end of said rib form to terminate adjacent and in line with said leading edge, causing said rib winding strandings to pass over said adjacent ends and around the crown to anchor the trailing end of the rib form in place, feeding a fiber mat between said rib winding strands and said rib form, and causing said rib winding strands to be filament wound over the top of the mat.

9. The process of claim 8 wherein said guiding is performed by strand guides carried by an endless conveyor.

10. The method of claim 8 wherein said guiding is performed by a cylinder having abutment means arranged in a spiral and engaged by said strand to advance said strand longitudinally of said axis of said shell.

11. The method of claim 1 wherein the guiding, moving and winding steps are repeated for a second rib forming material at a position on the longitudinally advancing shell that is spaced longitudinally rearwardly of the shell location where said first described guiding, moving and winding steps took place to produce ribs at a predetermined spacing.

12. The method of claim 11 wherein said guiding, moving and winding steps are automatically repeated in timed relation to the longitudinal movement of said shell.

13. Filament winding apparatus comprising: a mandrel having a longitudinal axis, a material collection surface on said mandrel and which moves longitudinally of said axis, first drive means for rotating said mandrel about its longitudinal axis to cause the filaments to wind onto said material collection surface, a filament guide cylinder positioned to the side of said mandrel, said cylinder having a helical abutment on its outer surface for engaging filaments passing over said guide cylinder and being wound onto said material collection surface, and for advancing said filaments longitudinally thereof, means for applying resin to said filaments before said filaments contact said guide cylinder, and second drive means for rotating said cylinder in synchronism with said first drive means to move said filaments longitudinally with said material collection surface.

References Cited

UNITED STATES PATENTS

| | | | |
|---|---|---|---|
| 3,154,451 | 10/1964 | MacDougall | 156—172 |
| 3,393,918 | 7/1968 | Styka | 156—172 |
| 2,577,793 | 12/1951 | Miller | 118—234 |
| 3,464,879 | 9/1969 | Poulsen | 156—425 |
| 3,700,512 | 10/1972 | Pearson et al. | 156—171 |

DANIEL J. FRITSCH, Primary Examiner

U.S. Cl. X.R.

156—172, 173, 187, 188, 425, 429, 431, 432, 446; 242—7.19, 7.21, 7.22